(12) United States Patent
Larrieu

(10) Patent No.: US 8,532,179 B2
(45) Date of Patent: Sep. 10, 2013

(54) METHOD AND DEVICE FOR OPTIMIZING THE COMPRESSION OF A VIDEO STREAM

(75) Inventor: Jérôme Larrieu, Hasparren (FR)

(73) Assignee: Mobiclip, Paris (FR)

( * ) Notice: Subject to any disclaimer, the term of this patent is extended or adjusted under 35 U.S.C. 154(b) by 796 days.

(21) Appl. No.: 12/446,835

(22) PCT Filed: Oct. 26, 2007

(86) PCT No.: PCT/EP2007/009315
§ 371 (c)(1),
(2), (4) Date: Apr. 23, 2009

(87) PCT Pub. No.: WO2008/049628
PCT Pub. Date: May 2, 2008

(65) Prior Publication Data
US 2010/0027623 A1     Feb. 4, 2010

(30) Foreign Application Priority Data

Oct. 27, 2006    (FR) ...................................... 06 09432

(51) Int. Cl.
*H04N 7/32*     (2006.01)
*G06K 9/36*     (2006.01)

(52) U.S. Cl.
USPC .................................................... 375/240.12

(58) Field of Classification Search
None
See application file for complete search history.

(56) References Cited

U.S. PATENT DOCUMENTS

| | | | |
|---|---|---|---|
| 5,832,234 A | 11/1998 | Iverson et al. | |
| 2002/0080408 A1 * | 6/2002 | Budge et al. | ............... 358/261.2 |
| 2004/0156552 A1 | 8/2004 | Larrieu et al. | |
| 2006/0233251 A1 * | 10/2006 | Kim et al. | ................. 375/240.12 |
| 2008/0008238 A1 * | 1/2008 | Song | ......................... 375/240.11 |

FOREIGN PATENT DOCUMENTS

| WO | WO 03/054795 A2 | 7/2003 |
|---|---|---|
| WO | WO 03/091850 A2 | 11/2003 |
| WO | WO 2005/055612 A1 | 6/2005 |

OTHER PUBLICATIONS

Zeng W. et al.: "Rate shaping by block dropping for transmission of mpeg-precoded video over channels of dynamic bandwidth"; Proceedings of ACM Multimedia 96; Boston, Nov. 18-22, 1996; New York, ACM, US, Nov. 18, 1996, pp. 385-393.

Zeng W. et al.:"Geometric-Structure-Based error concealament with novel applications in block-based low-bit-rate coding"; IEEE Transactions on Circuits and Systems for Video Technology; IEEE Service Center, Piscataway, NJ, US, vol. 9, No. 4, Jun. 1999.

\* cited by examiner

*Primary Examiner* — Thai Tran
*Assistant Examiner* — Sunghyoun Park
(74) *Attorney, Agent, or Firm* — Nixon & Vanderhye P.C.

(57) ABSTRACT

A method and device for compressing at least a portion of a video image such that a compressed video stream includes, or does not include, an encoding of a residual depending on whether it is advantageous to do so in terms of costs in rate and in distortion. The size of the video stream and resources needed for decompression are optimized through encoding only the most relevant data in the video stream. If the information added by the residual is insufficiently relevant or useful, the residual is not encoded. Factors associated with the residual are only encoded if use of the residual limits the distortion in a satisfactory manner and if the encoding of the associated factors does not generate too high a rate. Use of the method makes it possible to optimize resources needed for a decoder by optimizing the encoding of the residual.

5 Claims, 6 Drawing Sheets

METHOD AND DEVICE FOR OPTIMIZING THE COMPRESSION OF A VIDEO STREAM

CROSS REFERENCE TO RELATED APPLICATIONS

The present application is based on and claims priority to International Application PCT/EP2007/009315 filed on Oct. 26, 2007 and French Patent Application No. 06/09432 filed on Oct. 27, 2006, the contents of which are hereby incorporated by reference in their entirety.

BACKGROUND OF THE INVENTION

This invention pertains to a method and device for compressing portions of images. In particular, it applies to encoding images and sequences of images, especially for the purpose of transmitting them over a computer network, such as the Internet, or for storing them on a digital information medium. This method and device may be integrated into any system with the ability to compress and then decompress any portion of an image on all hardware platforms.

Certain video encoding methods use predictive methods with residual encoding. FIG. 1 depicts a device implementing such a method, in the form of a block diagram. A prediction made by the function 102, of one portion of an original image 101 is created based on other portions of one or more images appearing before or after the image being encoded, or other elements of the current image. The residual 103 is obtained through the difference 105 between the prediction and the original. The residual 103 and the prediction 102 are encoded in the sent video stream by the encoding function 104.

This method is typically used to take advantage of the temporal redundancy of a sequence of images. It is particularly often-used in the compression system of the ISO/ITU/MPEG and H.261/3/4 standards. As depicted in FIG. 2, which, in the form of a flowchart, depicts the prior art for MPEG ("Moving Picture Expert Group") compression, the motion compensation is based on comparing a given block of the current image to a set of blocks or sub-blocks of the current image, or other images appearing before or after the current image. A comparative measurement is taken between the blocks. If the measurement of the difference is below a certain threshold, the blocks are considered to be similar, and the difference in position is indicated by a motion vector.

Known video compression standards, such as MPEG, use the two groups of steps 200 and 210, described with reference to FIG. 2, to compress the images of a video stream into non-intra images, meaning images which are encoded with reference to other images of the video stream.

Motion estimation 200 consists of encoding each image based on elements found in other images of the video stream, known as reference images (often the preceding image, the last intra image, or the next intra image). The steps performed during motion estimation 200 are as follows:
  step 201: breaking down the image to be encoded into blocks with a fixed size of W×H pixels (often 16×16);
  step 202: for each image block, searching within the reference image of the floating area of W×H pixels that is most similar to the block in question;
  step 203: for each block, storing the motion vector that indicates motion (in spatial coordinates) between the block the block and the most similar block found during step 202;
Motion compensation 210 consists of compressing the residual. The steps performed during motion compensation 210 are, for each block, as follows:
  step 214: for each block, calculating the residual, i.e. the difference between the block and the most similar area found.
  step 211: compressing the residual, most commonly using a mathematical function, such as DCT (for "discrete cosine transform");
  step 212: storing the compressed residual; and
  step 213: returning to step 200 to encode the next block, if any.
Video decompression is done as follows:
  step 221: decompressing one or more intra images (i.e. images encoding without reference to other images of the video stream);
  group of steps 230: reconstructing the non-intra images by doing the following for each block:
    step 231: locating the are most similar to another image in the video stream, using the motion vector;
    step 232; decompressing the residual; and
    step 233; adding the residual to the most similar area in order to obtain the final block, then returning to step 230 for the next block, if any.
Thus, when decoding a video stream, blocks of predicted images are predicted based on portions of other images and decoded motion vectors, to which motion compensation factors must be added.

This prior art, in particular, has the disadvantage that the motion compensation factor decoding, compensation calculation and predicted block compensation steps are costly in resources.

In current encoders, different types of optimization are performed during the compensation steps. For example, the motion vector may be chosen based on different criteria: "SAD" (sum of absolute differences) or "SSD" (sum of square differences), which only take the resulting distortion into account. During encoding, multiple types of connections (blocks, motion vectors) may be chosen. Rate distortion optimization (or "RDO") is used and takes into account the rate at which the information is transmitted (the size taken within the stream) and the distortion caused by this information (relevance of information). The purpose of RDO is to locate a compromise between the rate used by the encoded stream and the relevance of the information to be encoded.

The RDO algorithm may be used during motion compensation. For example, in patent application US2003/0063667 entitled "Optimal encoding of motion compensated video" and dated May 29, 2002, the step of estimating motion between two images provides multiple possible motion vectors to choose from. Each motion vector is then transformed in the same way as though it has been transformed to be encoded into the video stream, then is decoded in the same way as though it had been decoded from the video stream. The distortion between the original block and the encoded and then decoded block, calculated after decoding the motion vector, is determined for each possible motion vector. The motion vector which minimizes the distortion and rate is chosen.

Generally, motion compensation is used to save on rate and distortion costs. Patent application EP0866622 entitled "Video data compression method" defines a performance measurement (which takes encoding parameters into account) which is applied to the motion compensation step, for the purpose of improving the measurement of rate and distortion costs.

In En-hui Yang and Xiang Yu's article "Rate Distortion Optimization in H.264", published during the workshop organized for the inauguration of the "Information Theory and Applications Center" in February 2006, the RDO algorithm makes it possible to establish a flexible decision criterion for choosing factor encoding criteria. A tree is created, the nodes of which represent different encoding steps and measure the resulting rate and distortion costs. The tree is then traveled, taking the best path (minimizing rate and distortion costs) to obtain the most relevant choice of encoding for the rate and distortion resulting from the factor encoding.

In patent application FR2850827 entitled "Procèdè et dispositif de compression de parties d'images" ("Method and device for compressing portions of images"), the step of motion compensation is eliminated. However, in some cases, the visual output is noticeably worse.

BRIEF SUMMARY OF THE INVENTION

This invention is intended to remedy this drawbacks.

To that end, this invention firstly discloses a method for compressing portions of images, comprising:

- a step of determining at least one prediction of a said image portion, based on a set of sub-portions of earlier and later images, or the current image.
- an optional step of determining a rate associated with each prediction, based on each prediction,
- a step of determining a distortion associated with each prediction, and
- a step of deciding whether or not to encode the residual, based at least on the distortion value associated with each prediction.

In this manner, the invention optimizes the size of the video stream and resources needed for decompression by only coding the most relevant date in the video stream.

The implementation of the inventive method, as briefly described above, thereby makes it possible to optimize the resources used in the decoder by optimizing the encoding of the residual.

Owing to these measures, if the information added by the residual is insufficiently relevant or useful, the residual is not encoded in the feed. In this manner, for certain blocks, the decoding of the factors of the residual and the adding of the residual to the reconstructed block, which are costly in resources, are avoided.

The determination of the distortion resulting from the sole encoding of each prediction is accurate, because, when encoding, the image portion as it would have been decoded in the absence of motion compensation is available.

In particular embodiments, the method as briefly described above further comprises:

- a step of determining the residual, i.e. the difference between a prediction representative of each prediction and the portion of the image to be compressed,
- a step of determining the rate associated with the residual,
- a step of determining the distortion associated with the residual,
- said decision step implementing said rate associated with the residual and the distortion associated with the residual.

In this manner, the factors associated with the residual are only encoded if the use of this residual limits the distortion in a satisfactory manner and if the encoding of the factors of this residual does not generate too high a rate.

In particular embodiments, the method as briefly described above further comprises:

- a step of transforming said residual to the frequency domain,
- a step of quantizing the transformed residual,
- a step of dequantizing the quantized transformed residual,
- a step of transforming the transformed, quantized, and dequantized residual to the space domain, said step of determining the distortion associated with each residual depending upon said residual and the transformation of the transformed, quantized, and dequantized residual to the space domain.

Owing to these measures, the determination of the distortion resulting from the residual encoding is accurate, because, when encoding, the residual as it would have been obtained when decoding is available.

In particular embodiments, the decision step comprises the comparison of decision parameters RD1 and RD2, calculated as follows:

$$RD1 = Rp * \epsilon + Dp = k + Dp;$$

$$RD2 = (Rp + Rr) * \epsilon + Dr = k + Rr * \epsilon + Dr$$

where:

- Rp is the rate associated with each prediction,
- Dp is the distortion associated with each prediction,
- Rr is the rate associated with the residual,
- Dr is the distortion associated with the residual, and
- $\epsilon$ is a positive predetermined factor.
- k is the product of Rp and $\epsilon$. It is not necessary to determine it to make the comparisons below, because the term is found in RD1 and RD2.

In particular embodiments, during the decision step:

if RD1≦RD2, only every prediction is transmitted, and
if RD1>RD2, every prediction and each residual is transmitted.

The step of determining Rp, the rate associated with each prediction, is not necessary, because the term "Rp*$\epsilon$" is found in both decision parameters, RD1 and RD2. It is therefore possible to compare RD1 to RD2, without calculating k.

Owing to these measures, the decision is simple to implement, and is related to a known rate-distortion criterion.

In particular embodiments, the decision step comprises the comparison of a decision parameter RD1 and a threshold value RDt which depends upon $\epsilon$, with RD1=Rp*$\epsilon$+Dp where:

- Rp is the rate associated with each prediction,
- Dp is the distortion associated with each prediction, and
- $\epsilon$ is a positive predetermined factor.

If RD1≦RDt, only every prediction is encoded, and if RD1>RDt, every prediction and the residual are encoded.

Owing to these measures, the encoder is simplified, and the resources consumed when encoding are limited, because the decision of whether to encode the residual depends only upon a rate-distortion criterion that only takes into account rates and distortions linked to each prediction.

In particular embodiments, if the value "Rp*$\epsilon$" is assumed, as before, to be a term which does not influence the decision step, then the decision step comprises the comparison of a decision parameter RD1 and the threshold value RDt, which depends upon $\epsilon$, with RD1=Dp, where:

- Dp is the distortion associated with each prediction, and
- $\epsilon$ is a positive predetermined factor.

If RD1≦RDt, only every prediction is encoded, and if RD1>RDt, every prediction and the residual are encoded.

Owing to these measures, the encoder is simplified, and the resources consumed when encoding are limited, because the decision of whether to encode the residual depends only upon a distortion criterion.

In particular embodiments, the decision step comprises the comparison of a decision parameter RD1 and a threshold value RDt which depends upon $\epsilon$, with RD1=Rp*$\epsilon$+Dp=k+Dp where:

Rp is the rate associated with each prediction,
Dp is the distortion associated with each prediction,
ε is a positive predetermined factor, and
k is the product of Rp and E. It is not necessary to determine it to compare RD1 to RD2, because the term is found in RD1 and RD2, and it is option to compare RD1 to RDt.

If RD1≦RDt, only every prediction is encoded, and if RD1>RDt, the residual is calculated, and the rate Rr and distortion Dr of the residual are determined. RD2 is calculated in the following manner RD2=k+Rr*ε+Dr:
where:
Rr is the rate associated with the residual,
Dr is the distortion associated with the residual.

If RD1≦RD2, only every prediction is transmitted, and if RD1>RD2, every prediction and the residual are transmitted.

The step of determining Rp, the rate associated with each prediction, is not necessary, because the term "Rp*ε." is found in both decision parameters, RD1 and RD2. It is therefore possible to compare RD1 to RD2 without calculating k.

Owing to each of these measures, the encoder is simplified, and the resources consumed when encoding are limited, because the decision of whether to encode the residual depends only upon a rate-distortion criterion that only takes into account distortion and potentially rates linked to each prediction.

Secondly, this invention discloses a device for compressing a portion of an image, said device comprising:
   a means for determining at least one prediction of a said image portion,
   a means for determining distortion associated with each prediction, and
   a means for deciding whether or not to encode the residual, based at least upon the distortion value associated with each prediction.

As the advantages, purposes, and features of this device are similar to those of the inventive method, described above, they are not reiterated here.

BRIEF DESCRIPTION OF THE DRAWINGS

Other advantages, purposes, and features of this invention will become apparent upon reading the following description, with reference, in an explanatory and non-limiting fashion, to the attached drawings, in which.

DETAILED DESCRIPTION OF THE INVENTION

Figure 1:
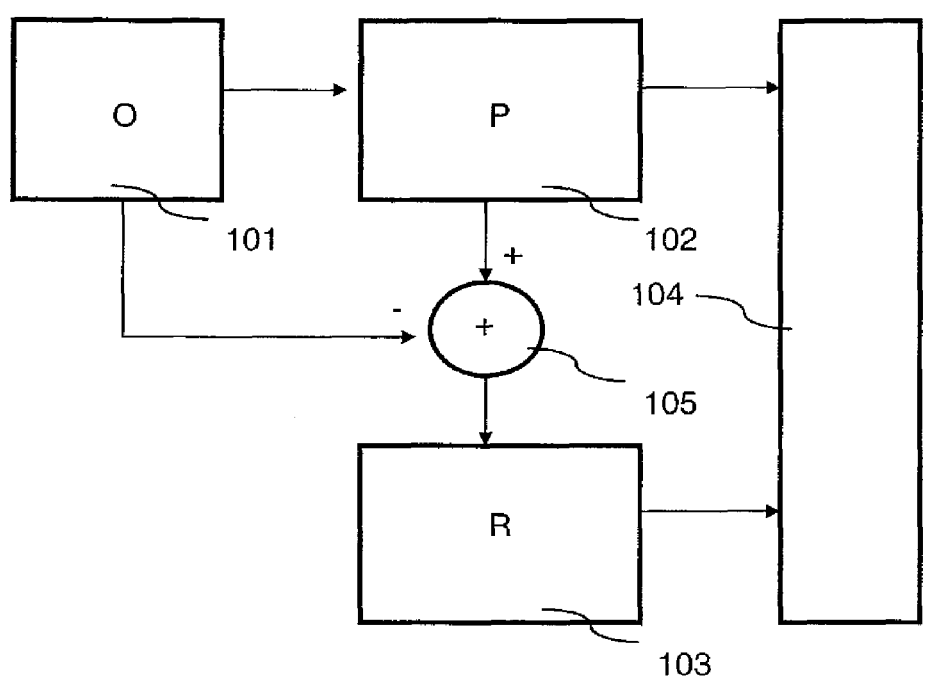
FIG. 1 depicts, in the form of a block diagram, an encoding method with prediction encoding and residual encoding, known from the prior art.
Figure 2:
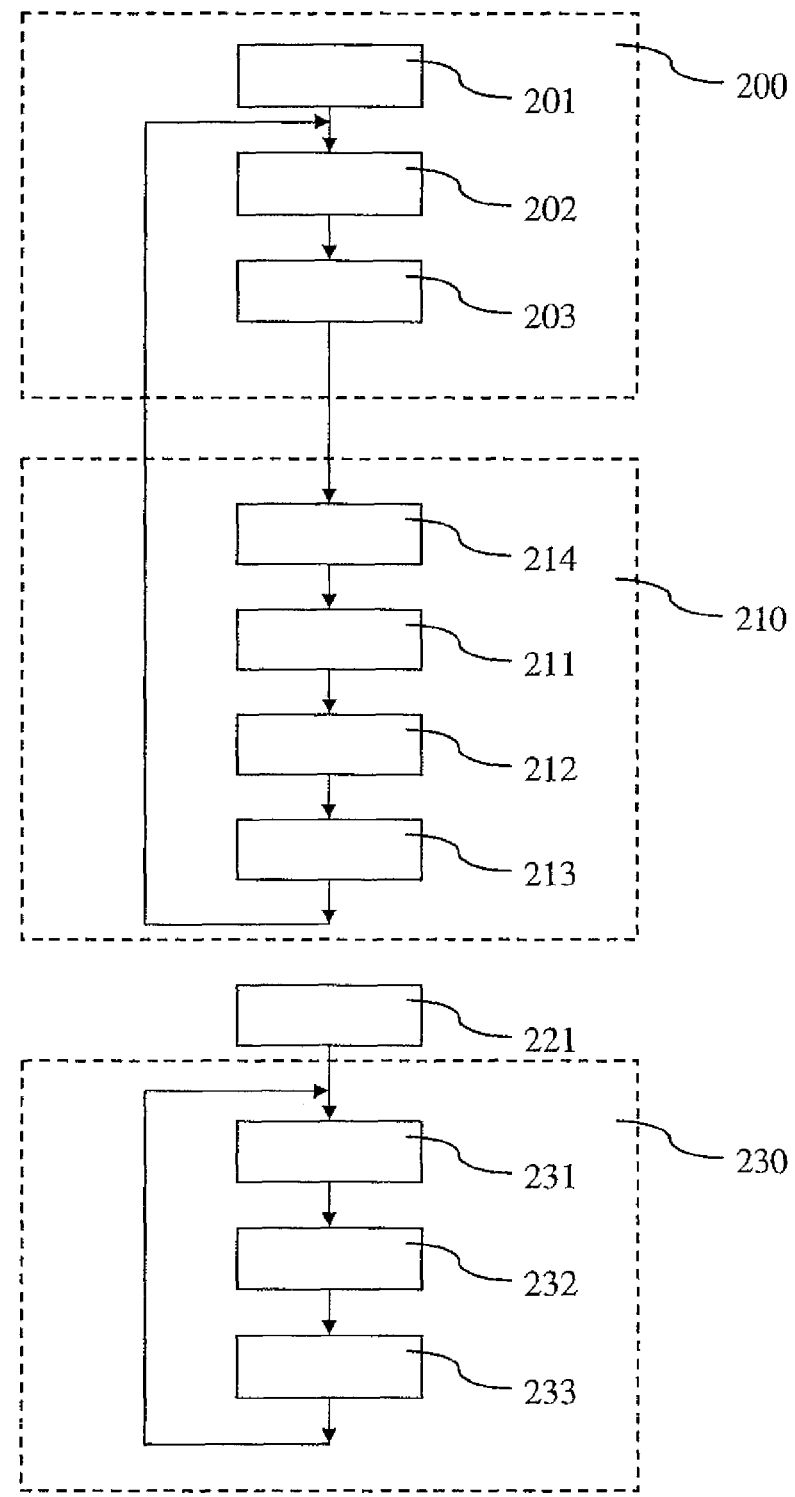
FIG. 2 depicts, in the form of a flowchart, the steps implemented in a method for compressing, and a method for decompressing, associated images, said methods being known from the prior art.
Figure 3:
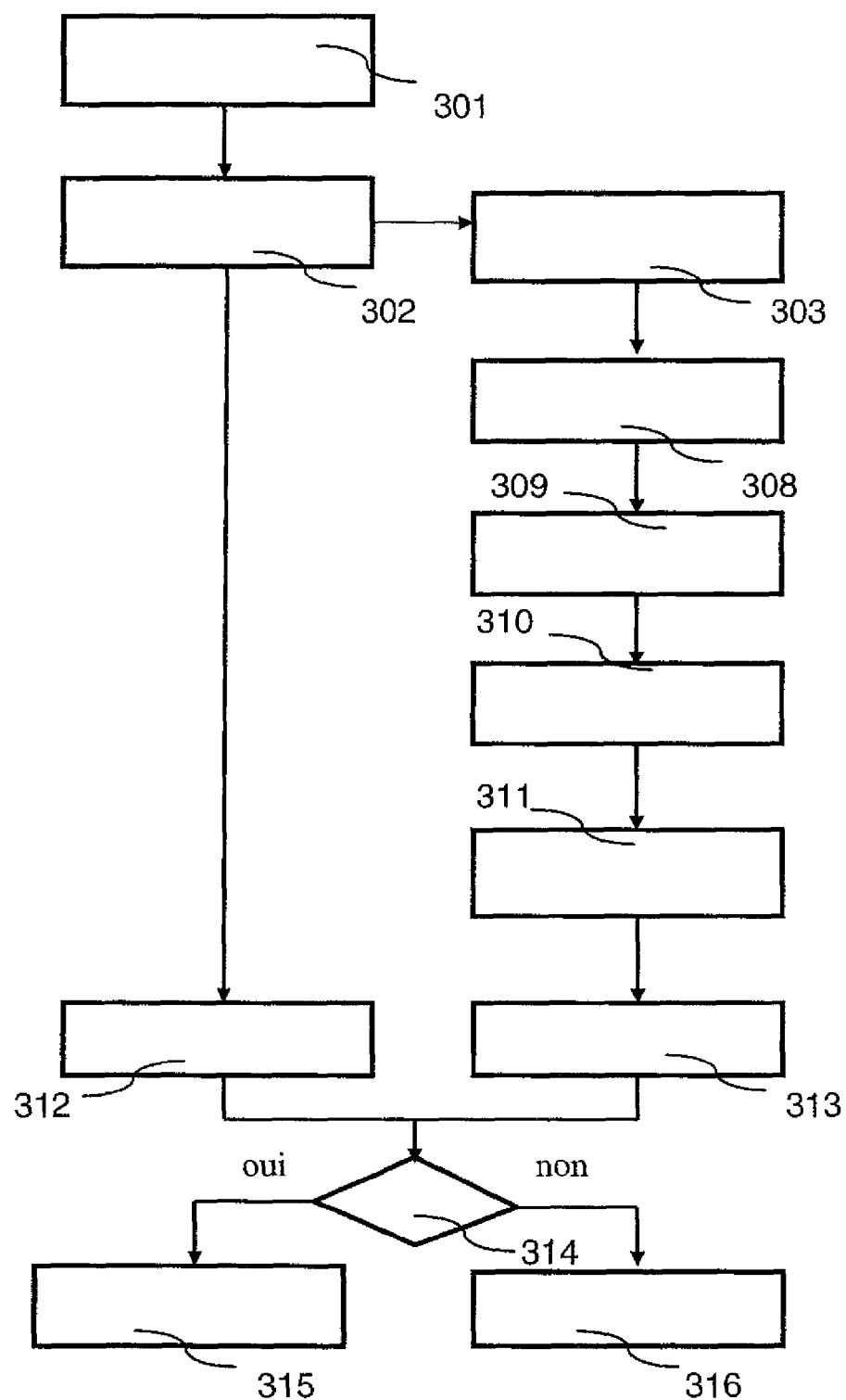
FIGS. 3 to 6 depict, in the form of flowcharts, steps implemented in particular embodiments of the inventive method.

In the particular embodiment shown in FIG. 3, during a step 301, the image to be encoded is broken down into blocks and stored in a memory area of an encoding or compression device. The following steps, 302 to 316, are performed in succession for every block of the image to be encoded.

During a step 302, a motion estimate is made in a known manner, such as the one described in patent application FR2850827 for providing a prediction, with respect to every reference image.

During a step 312, the distortion caused by every encoded prediction is determined and stored in memory, and optionally, the rate corresponding to each prediction is determined and stored in memory.

A distortion measurement corresponding to the block obtained during step 312 is then calculated, such as by using the SSD method. This distortion, and the distortion that the decoding generated, correspond to the only prediction(s) encoded in the video stream.

At the same time as step 312, during a step 303, the difference between the prediction and the original block to be encoded is determined, and the residual, i.e. the result of that difference, is written to memory.

During a step 308, the residual is transformed to the frequency domain.

Then, during a step 309, the transform of the residual is quantized, and the quantized transformed residual is encoded.

During a step 310, the quantized residual transform is inversely quantized.

During a step 311, the result of step 310 is transformed to the space domain. The result obtained in this manner is the residual that the decoding device would decode based on the encoded video stream.

During step 313, the rate needed to encode the transformed quantized residual resulting from step 309 is determined, and the distortion that would be generated by the decoded residual resulting from step 311 is calculated. This rate and distortion are stored in memory.

During a step 314, it is determined whether, for a given block, the result of step 309 must be transmitted to the decoding device. To that end, based on the data saved in memory, the following decision parameters RD1 and RD2 are calculated:

$$RD1 = Rp*\epsilon + Dp = k + Dp;$$

$$RD2 = (Rp+Rr)*\epsilon + Dr = k + Rr*\epsilon + Dr$$

where:
Rp is the rate of the predicted block,
Dp is the distortion of the predicted block,
Rr is the rate of the residual,
Dr is the distortion of the residual, and
ε, a positive value, is set by the programmer or user of the coder/decoder, or is configured based on the resources available to the decoding device.
k is the product of Rp and ε. It is not necessary to determine it to make the following comparisons, because the term is found in both RD1 and RD2.

If RD1≦RD2, the encoding of the motion compensation data is not relevant to the decreases in the rate and the increases in distortion. In such a case, during a step 316, only all the predictions are encoded into the video stream, such as through the sound encoding or its motion vectors.

If RD1>RD2, the motion compensation data encoding is relevant to the decreases in the rate and the increases in distortion. In such a case, during a step 315, each motion compensation prediction is encoded into the video stream, such as through the sound encoding or its motion vectors and the quantized transformed residual.

RD1 represents a rate-distortion criterion linked to the only encoding of every prediction, and RD2 represents a rate-distortion criterion related to the encoding of every prediction and residual.

In the RD2 measurement, the factor that represents the rate is (Rp+Rr), and therefore two rates may be taken into account: that of the predicted block and that of the residual, because the residual is by necessity encoded with the predicted block.

However, the step of determining Rp, the rate associated with each prediction, is not necessary, because the term "Rp*ϵ" is found in both decision parameters, RD1 and RD2. It is therefore possible to compare RD1 to RD2 without calculating k.

In a second particular embodiment described with reference to FIG. 4, during a step 401, the image to be encoded is broken down into blocks, and the blocks of the image to be encoded are stored in a memory area. The following steps, 402 to 416, are performed in succession for every block of the image to be encoded.

During a step 402, a motion estimation is performed and at least one prediction is provided.

During step 405, the distortion Dp caused by the prediction is determined.

Optionally, the rate Rp needed to send each prediction may be determined.

At the same time as step 405, during a step 403, the difference between the prediction and the corresponding block in the original image to be encoded is determined, and this difference, known as the "residual", is saved to memory.

During a step 408, the residual data is transformed into frequencies through DCT transformation, and the transform of the residual is quantized.

During a step 413, the rate Rr needed to encode the transformed, quantized residual, and these results are saved to memory.

During a step 414, it is determined whether, for a given block, the result of step 413 must be transmitted to the decoding device. To that end, based on the data saved in memory, the following decision parameters RD1 and RD2 are calculated:

$$RD1 = Rp*\epsilon + Dp = k + Dp;$$

$$RD2 = (Rp+Rr)*\epsilon + Dr = k + Rr*\epsilon + Dr$$

where:
Rp is the rate of the predicted block,
Dp is the distortion of the predicted block,
Rr is the rate of the residual
Dr is the distortion of the residual, and
ϵ, a positive value, is set by the programmer or user of the coder/decoder, or is configured based on the resources available to the decoding device.
k is the product of Rp and ϵ. It is not necessary to determine it to make the following comparisons, because the term is found in both RD1 and RD2.

RD1 represents a rate-distortion criterion linked to the only encoding of every prediction, and RD2 represents a rate-distortion criterion related to the encoding of every prediction and residual.

In the RD2 measurement, the factor that represents the rate is (Rp+Rr), and therefore two rates may be taken into account: that of the predicted block and that of the residual, because the residual is by necessity encoded with the predicted block. However, the step of determining Rp, the rate associated with each prediction, is not necessary, because the term "Rp*ϵ" is found in both decision parameters, RD1 and RD2. It is therefore possible to compare RD1 to RD2 without determining k.

If RD1≦RD2, the motion compensation data encoding is not relevant to the decreases in the rate and the increases in distortion, and only every prediction is encoded in the video stream during step 416.

If RD1>RD2, the motion compensation data encoding is relevant to the decreases in the rate and the increases in distortion, and during a step 415, the predicted block and the motion compensation are encoded in the video stream.

Figure 4:
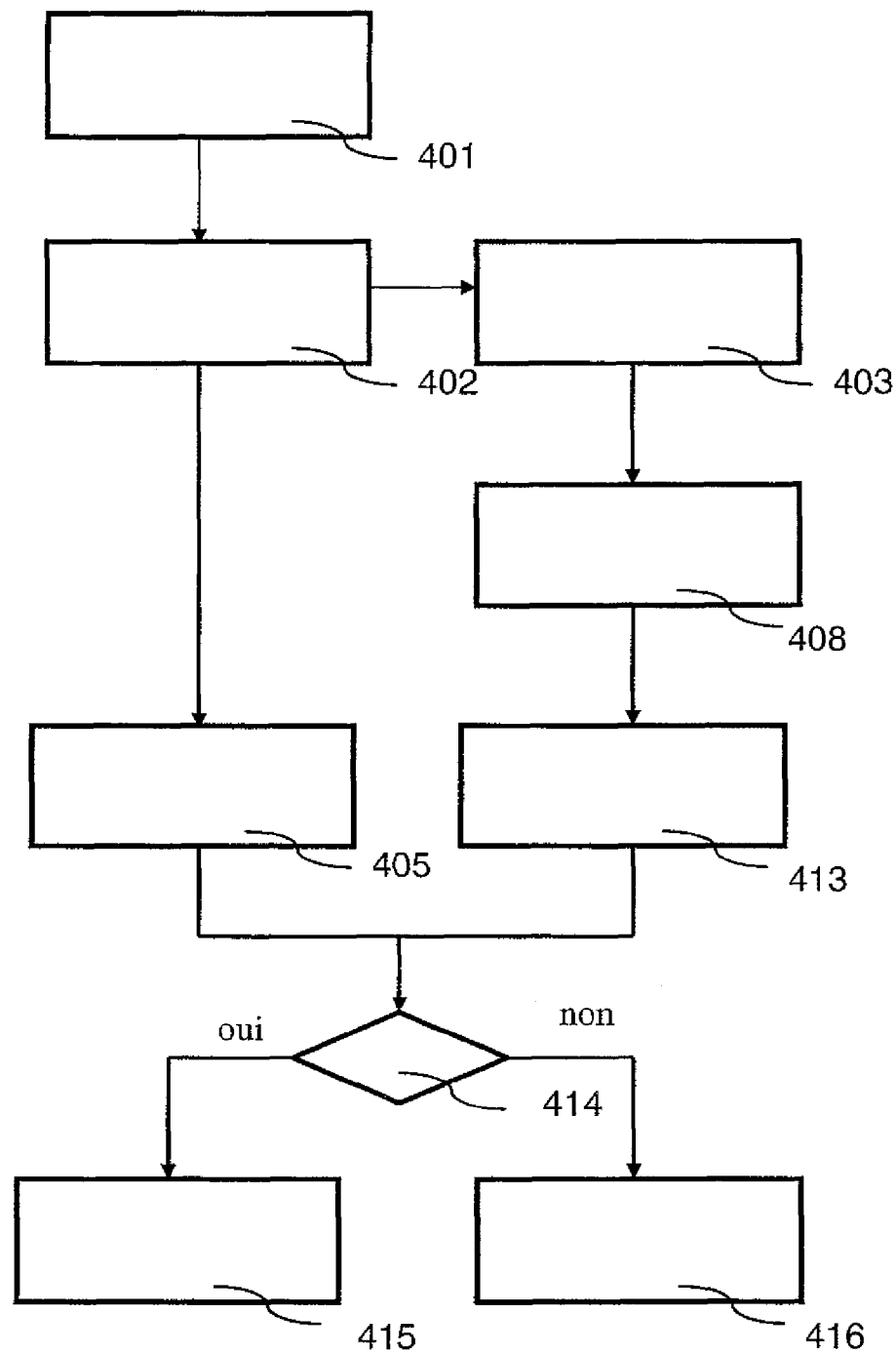

In this manner, compared with the embodiment shown in FIG. 3, the second embodiment shown in FIG. 4 does not include steps of inversely quantizing or inversely transforming the transformed, quantized residual. Based on the transformed, quantized residual, the rate and distortion that would be generated by the motion compensation within the encoded stream. Consequently, in the second embodiment, rounding errors caused by the quantization and transform are not taken into account.

Figure 5:
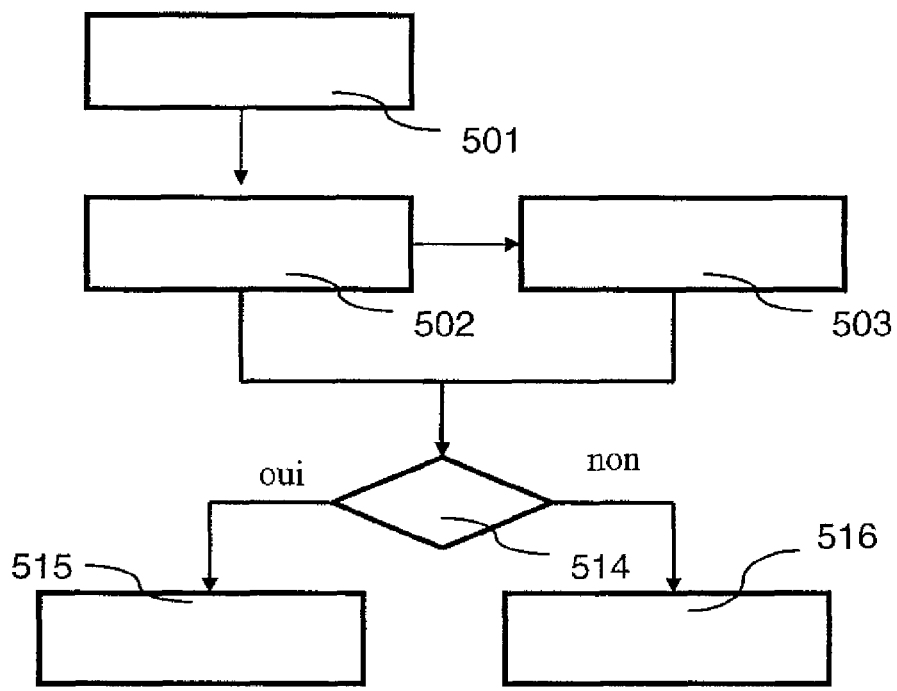

In a third embodiment shown in FIG. 5, during a step 501, the image to be encoded is broken down into blocks, and the blocks of the image to be encoded are saved to memory. The following steps, 502 to 516, are performed in succession for every block of the image to be encoded.

During a step 501, the motion estimation of the current block of the image to be encoded is performed, and at least one prediction is provided.

Next, during a step 503, the difference between the prediction and the block from the original image to be encoded is determined, and the results of this difference, known as the "residual," are written to memory.

During a step 514, the distortion Dp and optionally the rate Rp that would be generated by the encoding of each prediction in the video stream are estimated, and Dp and optionally Rp are stored in memory.

During step 514, it is determined whether, for a given block, the residual must be transmitted to the decoding device. To that end, based on the data saved in memory, the following decision parameters RD1 and RD2 are calculated;

$$RD1 = Rp*\epsilon + Dp = k + Dp;$$

$$RD2 = (Rp+Rr)*\epsilon + Dr = k + Rr*\epsilon + Dr$$

where:
Rp is the rate of the predicted block,
Dp is the distortion of the predicted block,
Rr is the rate of the residual,
Dr is the distortion of the residual, and
ϵ, a positive value, is set by the programmer or user of the coder/decoder, or is configured based on the resources available to the decoding device.
k is the product of Rp and ϵ. It is not necessary to determine it to make the following comparisons, because the term is found in both RD1 and RD2, RD1 represents a rate-distortion criterion linked to the only encoding of every prediction, and RD2 represents a rate-distortion criterion related to the encoding of every prediction and residual. In the RD2 measurement, the factor that represents the rate is (Rp+Rr), and therefore two rates may be taken into account: that of the predicted block and that of the residual, because the residual is by necessity encoded with the predicted block. However, the step of determining Rp, the rate associated with each prediction, is not necessary, because the term "Rp*ϵ" is found in both decision parameters, RD1 and RD2. It is therefore possible to compare RD1 to RD2 without determining k.

If RD1≦RD2, the motion compensation data encoding is not relevant to the decreases in the rate and the increases in distortion, and only every prediction is encoded in the video stream during step 516.

If RD1>RD2, the motion compensation data encoding is relevant to the decreases in the rate and the increases in distortion, and during a step 515, the predicted block and the motion compensation are encoded in the video stream.

In this manner, it is possible to have a stream that not only costs fewer resources when decoding, but also costs fewer resources to be encoded, because, for some blocks, the step of encoding the motion compensation is eliminated.

Figure 6:
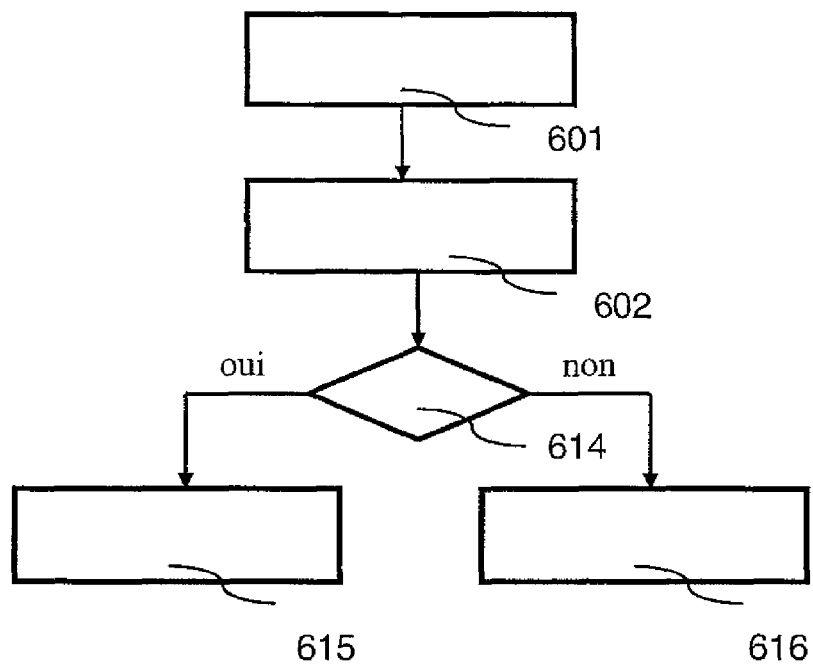

In a fourth embodiment, shown in FIG. 6, the image to be encoded is broken down into blocks, and stored in a memory area, during a step 601. The following steps, 602 to 616, are performed in succession for every block of the image to be encoded.

During a step 602, the motion estimation of the current block of the image to be encoded is performed, and at least one prediction is provided.

During a step 614, the rate Rp and optionally the distortion Dp that would be generated by the encoding of each prediction within the video feed are calculated, and Rp and optionally Dp are saved to memory. During step 614, it is determined whether a motion compensation, or a residual must be encoded, in the following manner: the decision parameter $$RD1=Rp*\epsilon+Dp$$

is calculated, where:

Rp is the rate of the predicted block (optional),
Dp is the distortion of the predicted block, and
$\epsilon$, a positive value, is set by the programmer or user of the coder/decoder, or is configured based on the resources available to the decoding device.

If RD1≦RDt, where RDt is a threshold value determined by the programmer of the encoder, only every prediction is encoded into the video stream during step 616.

If RD1>RDt, the predicted block is encoded into the video stream, and the motion compensation of the predicted block is determined and then encoded into the video stream during step 615.

If, as before, it is assumed that the value Rp*$\epsilon$" is a term which does not influence the decision step, then the decision step comprises the comparison of a decision parameter RD1, calculated as RD1=Dp, and the threshold value RDt, which depends upon E.

In this manner, it is possible to have a stream that not only costs fewer resources when decoding, but also costs fewer resources to be encoded, because, for some blocks, the step of encoding the motion compensation is eliminated.

It has been noted that, in some variants, the RDO rate known to a person skilled in the art is implemented.

Figure 7:
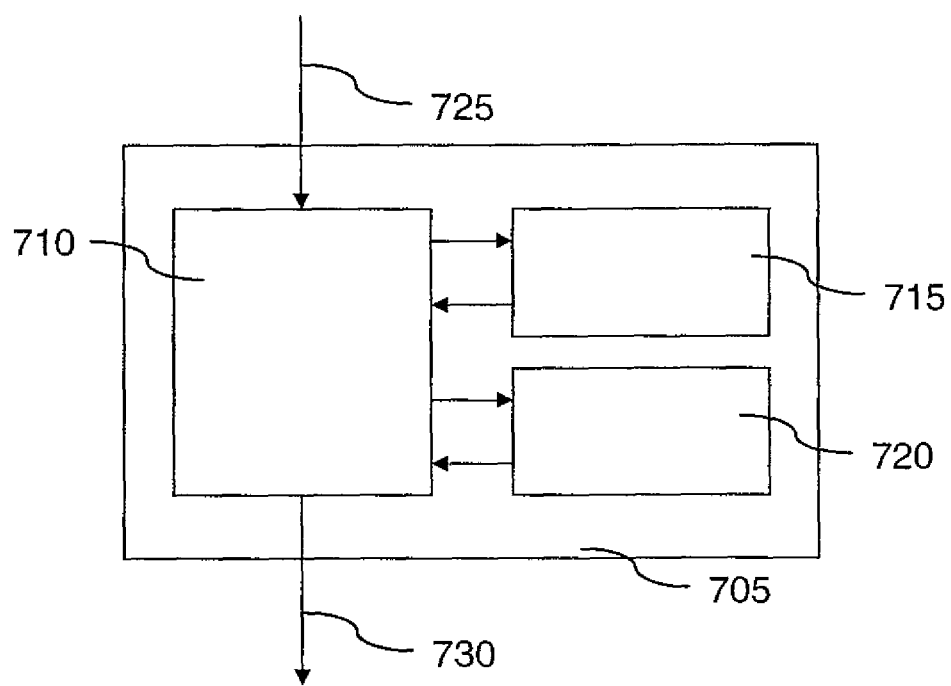
FIG. 7 depicts a particular embodiment of the inventive device.

FIG. 7 depicts a particular embodiment of the inventive device for compressing portions of images 705. This device 705 comprises an input for signals that represent images 725, a processor 710, a program memory 715, an image memory 720, and a compressed image signal output 730.

The processor 710 is of a known type. In combination with the memories 715 and 720, it is suitable for implementing an embodiment of the inventive method, such as one of those depicted in FIGS. 3 to 6.

To that end, the program memory 715 contains instructions that are readable by the processor 710, implementing the steps of the method to be implemented.

Thus, in combination with the memories 715 and 720, the processor 710 constitutes at least:
a means for determining at least one prediction of a said image portion,
a means for determining distortion associated with each prediction, and
a means for deciding whether or not to encode residuals, based on at least the rate and distortion values associated with each prediction.

In one particular embodiment of the invention, a prediction of a block may be made based on a set of previously processed blocks, which belong to the same image as the block currently being processed. This prediction may be made using a function applied to that set of blocks; for example, the function may be a combination of color information for blocks adjacent to the block currently being processed.

The invention claimed is:

1. A video compression method executed using an information processing apparatus having one or more processor in a system having ability to compress a portion of an image on a hardware platform, comprising:
   determining, via at least one processor, at least one prediction of said image portion;
   determining, via at least one processor, a distortion associated with each prediction;
   determining a residual, via at least one processor, the residual being a difference between said image portion and said at least one prediction; and
   deciding, via at least one processor, whether or not to encode the residual, based on at least the distortion associated with said prediction, wherein said deciding further comprises using said at least one processor for comparing a decision parameter RD1 and a threshold value RDt, with RD 1=k +Dp where:
   k is an optional term; and
   Dp is a distortion value associated with a prediction.

2. A method of claim 1, wherein, if RD1 ≦RDt, only every prediction is encoded, and if RD 1>RDt, every prediction and the residual are encoded.

3. The method according to claim 2 further comprising determining a rate, Rp, associated with every prediction, and calculating the optional term k, with k=Rp* $\epsilon$, where $\epsilon$ is a positive predetermined factor.

4. A video compression method executed using an information processing apparatus having one or more processor in a system having ability to compress a portion of an image on a hardware platform, comprising:
   determining, via at least one processor, at least one prediction of said image portion;
   determining, via at least one processor, a distortion associated with each prediction;
   determining a residual, via at least one processor, the residual being a difference between said image portion and said at least one prediction; and
   deciding, via at least one processor, whether or not to encode the residual, based on at least the distortion associated with said prediction, wherein deciding whether or not to encode the residual further comprises comparison of decision parameters RD1 and RD2, calculated as follows:

$$RD1=k+Dp;$$

$$RD2=k+Rr*e+Dr$$

Where:
Rp is the rate associated with each prediction;
Dp is the distortion associated with each prediction;
Rr is the rate associated with the residual;
Dr is the distortion associated with the residual;
e is a positive predetermined factor; and
k is an optional term.

5. A method of claim 4, wherein during said deciding:
(a) if RD1≦RD2, only every prediction is transmitted; and
(b) if RD1>RD2, every prediction and each residual is transmitted.

* * * * *